(12) United States Patent
Kramer et al.

(10) Patent No.: US 7,232,532 B2
(45) Date of Patent: Jun. 19, 2007

(54) CATALYTIC PARTIAL OXIDATION PROCESS USING A CATALYST SYSTEM HAVING AN UPSTREAM AND A DOWNSTREAM PART

(75) Inventors: Gert Jan Kramer, CM Amsterdam (NL); Willem Pieter Leenhouts, CM Amsterdam (NL); Ronald Jan Schoonebeek, CM Amsterdam (NL); Johannes Wijnbelt, CM Amsterdam (NL)

(73) Assignee: Shell Oil Company, Houston, TX (US)

( * ) Notice: Subject to any disclaimer, the term of this patent is extended or adjusted under 35 U.S.C. 154(b) by 290 days.

(21) Appl. No.: 10/450,602

(22) PCT Filed: Dec. 13, 2001

(86) PCT No.: PCT/EP01/14753

§ 371 (c)(1),
(2), (4) Date: Nov. 3, 2003

(87) PCT Pub. No.: WO02/47805

PCT Pub. Date: Jun. 20, 2002

(65) Prior Publication Data

US 2004/0075084 A1    Apr. 22, 2004

(30) Foreign Application Priority Data

Dec. 15, 2000    (EP) .................................. 00311291

(51) Int. Cl.
*C01B 3/26*    (2006.01)

(52) U.S. Cl. ........................ 252/373; 423/650; 423/651

(58) Field of Classification Search ..................... None
See application file for complete search history.

(56) References Cited

U.S. PATENT DOCUMENTS 3,509,043 A * 4/1970 McMaster et al. .......... 208/213
4,027,476 A * 6/1977 Schmidt ....................... 60/218
4,331,451 A * 5/1982 Isogaya et al. ............ 48/214 A (Continued)

FOREIGN PATENT DOCUMENTS

EP    0 303 438    2/1989

(Continued)

*Primary Examiner*—Wayne A. Langel
*Assistant Examiner*—Paul Wartalowicz

(57) ABSTRACT

The invention relates to a process for the catalytic partial oxidation of a hydrocarbonaceous feedstock, wherein a feed mixture having the hydrocarbonaceous feedstock and a molecular-oxygen containing gas is contacted with a catalyst system having an upstream part and a downstream part, the downstream part being in the form of a porous catalyst bed, wherein the catalyst system is retained in a reactor, the reactor having an upstream part that contains the upstream part of the catalyst system and a downstream part that contains the downstream part of the catalyst system, wherein the upstream part of the catalyst system only partly fills the cross-sectional area of the fluid flow path of the upstream part of the reactor and the downstream part of the catalyst system completely fills the cross-sectional area of the fluid flow path of the downstream part of the reactor. The invention further relates to a reactor having such a catalyst system and a catalytic reaction zone for the water-gas shift conversion of the effluent of the catalyst system, to a fuel cell system having such a reactor and a fuel cell, and to a vehicle provided with such a fuel cell system.

18 Claims, 1 Drawing Sheet

U.S. PATENT DOCUMENTS

| | | |
|---|---|---|
| 5,149,464 A | 9/1992 | Green et al. |
| 5,216,875 A * | 6/1993 | Kennelly et al. .............. 60/776 |
| 5,980,782 A * | 11/1999 | Hershkowitz et al. ...... 252/373 |
| 5,980,858 A * | 11/1999 | Fujimura et al. ............ 423/655 |
| 6,071,433 A * | 6/2000 | Bhattacharyya .............. 252/373 |

FOREIGN PATENT DOCUMENTS

| | | |
|---|---|---|
| EP | 0 576 096 | 12/1993 |
| EP | 0 913 357 | 5/1999 |
| JP | 61171530 | 8/1986 |
| WO | 99/19249 | 4/1999 |
| WO | 99/20384 | 4/1999 |
| WO | 99/37380 | 7/1999 |
| WO | 01/46068 | 6/2001 |

* cited by examiner

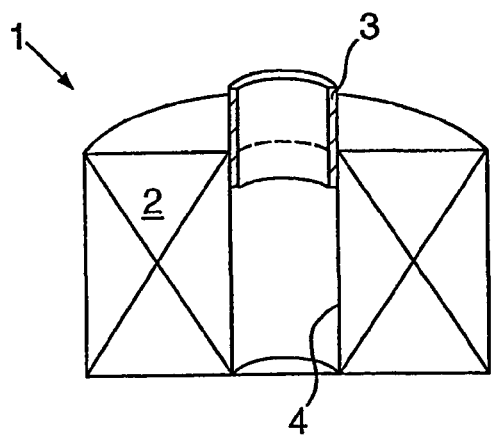
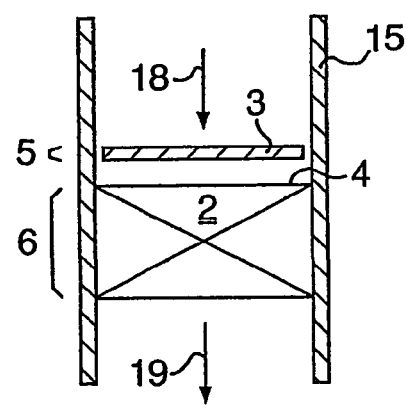
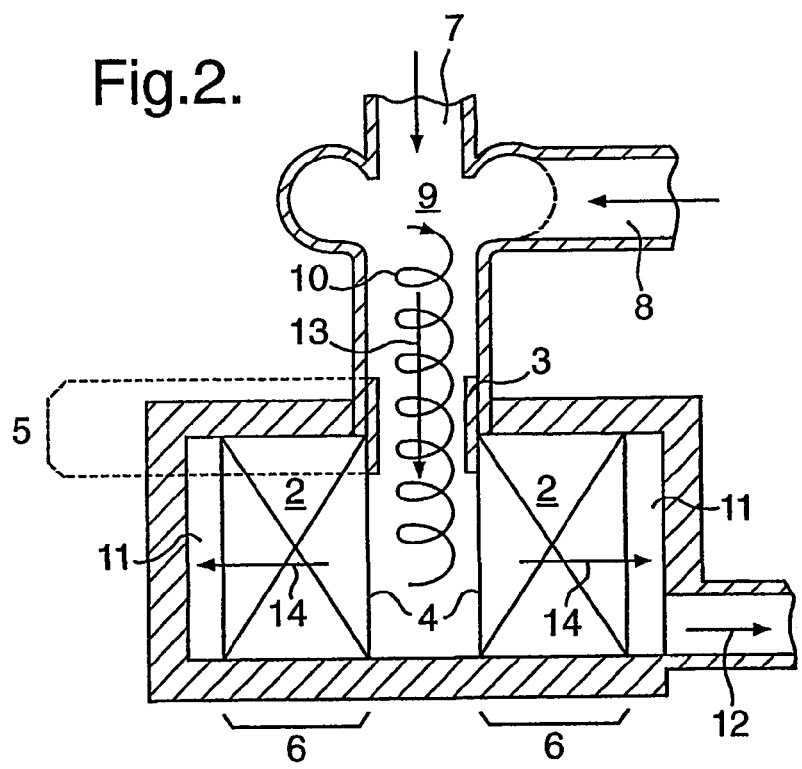

CATALYTIC PARTIAL OXIDATION PROCESS USING A CATALYST SYSTEM HAVING AN UPSTREAM AND A DOWNSTREAM PART

FIELD OF THE INVENTION

The present invention relates to a process for the catalytic partial oxidation of a hydrocarbonaceous feedstock, wherein a feed mixture comprising the hydrocarbonaceous feedstock and a molecular-oxygen containing gas is contacted with a catalyst system having an upstream part and a downstream part, to a reactor comprising such a catalyst system and a catalytic reaction zone for the water-gas shift conversion of the effluent of the catalyst system, to a fuel cell system comprising such a reactor and a fuel cell, and to a vehicle provided with such a fuel cell system.

BACKGROUND OF THE INVENTION

Partial oxidation of a hydrocarbonaceous feedstock, in particular hydrocarbons, in the presence of a catalyst is an attractive route for the preparation of mixtures of carbon monoxide and hydrogen, normally referred to as synthesis gas. The partial oxidation of hydrocarbons is an exothermic reaction represented by the equation:

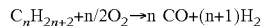

$$C_nH_{2n+2} + n/2 O_2 \rightarrow n\ CO + (n+1)H_2$$

There is literature in abundance on the catalysts and the process conditions for the catalytic partial oxidation of hydrocarbons. Reference is made, for instance, to EP-A-303 438, U.S. Pat. No. 5,149,464, EP-B-576 096, WO 99/37380, and WO 99/19249.

In a catalytic partial oxidation process in a fixed catalyst bed, the temperature of the top layer, i.e. the layer at the upstream end of the catalyst bed, is typically higher than the temperature further downstream in the catalyst bed. This is due to the fact that the catalytic partial oxidation reaction is mass and heat transfer limited, i.e. full conversion is subject to mass and heat transfer limitations between the bulk of the gaseous feed mixture and the catalyst surface, and/or that some endothermic reforming reactions might occur in the downstream part of the catalyst bed.

High temperatures in the top layer of the catalyst are unwanted, since the rate of catalyst deactivation increases with temperature. Therefore, there is a need in the art for a catalytic partial oxidation process wherein the temperature in the top layer of the catalyst bed can be reduced.

In International Patent Application WO 01/46068, it was found that, in a process for the catalytic partial oxidation of a hydrocarbonaceous feedstock using a fixed bed catalyst, the temperature of the upstream part of the catalyst can be reduced by carrying out the process in a reactor retaining the fixed bed catalyst, which reactor is designed such that a part of the conversion product flows back to the zone just upstream of the catalyst bed.

SUMMARY OF THE INVENTION

It has now been found that, in a catalytic partial oxidation process, very high temperatures at the upstream surface of the catalyst can be avoided by using a catalyst system having an upstream part wherein part of the feedstock is converted and a downstream part, wherein the conversion is substantially completed, wherein the upstream part of the catalyst system only fills part of the cross-sectional area of the flow path of the feed mixture.

Accordingly, the present invention relates to a process for the catalytic partial oxidation of a hydrocarbonaceous feedstock, wherein a feed mixture comprising the hydrocarbonaceous feedstock and a molecular-oxygen containing gas is contacted with a catalyst system having an upstream part and a downstream part, the downstream part being in the form of a porous catalyst bed, wherein the catalyst system is retained in a reactor, the reactor comprising an upstream part that contains the upstream part of the catalyst system and a downstream part that contains the downstream part of the catalyst system, wherein the upstream part of the catalyst system only partly fills the cross-sectional area of the fluid flow path of the upstream part of the reactor and the downstream part of the catalyst system completely fills the cross-sectional area of the fluid flow path of the downstream part of the reactor.

BRIEF DESCRIPTION OF THE DRAWINGS

FIG. 1 shows a side view of a longitudinal section of one embodiment of a catalyst system that can suitably be used in the process according to the invention.

FIG. 2 shows a longitudinal section of a part of a reactor containing the catalyst system of FIG. 1.

FIG. 3 shows a longitudinal section of a part of another embodiment of a reactor that can suitably be used in the process according to the invention.

DETAILED DESCRIPTION OF THE INVENTION

Reference herein to the cross-sectional area of the fluid flow path is to the cross-sectional area perpendicular to the overall flow direction of the fluid. The overall fluid flow direction in the upstream part of the reactor may be different from the fluid flow direction in the downstream part of the reactor. Reference herein to completely filling the cross-sectional area means that the catalyst bed, i.e. the honeycomb, foam, wire arrangement, packed bed or the like, completely fills the cross-sectional area. The catalyst bed as such of the downstream part of the catalyst system is porous and thus has, by definition, open area. This open area is not to be taken into account for determining whether the catalyst bed completely fills the cross-sectional area of the fluid flow path.

Since the cross-sectional area of the fluid flow path in the upstream part of the reactor is only partly filled with catalyst, part of the reactants can pass the catalyst without being contacted with the catalyst. In the downstream part of the reactor, the fluid flow path is completely filled with catalysts and the reactants are forced to contact the catalyst.

In the process according to the invention, part of the feedstock is converted at the upstream part of the catalyst system before the partially converted feedstock is contacted with the downstream part of the catalyst system. Preferably 5 to 75% (v/v) of the feedstock is converted at the upstream part of the catalyst system, more preferably 10 to 50% (v/v), even more preferably 15 to 40% (v/v).

Preferably, the upstream part of the catalyst system is smaller in volume than the downstream part of the catalyst system. More preferably, the volume of the upstream part is at most a fifth of the volume of the downstream part, even more preferably at most a tenth, most preferably at most a twentieth. Reference herein to volume is to the volume of the catalyst bed or arrangement including its pores.

As has been described hereinbefore, very high temperatures at the upstream surface of the downstream part of the catalyst system can be avoided in the process according to the invention. Without being bound to any theory, it is believed that the presence of conversion products in the fluids contacting the downstream part of the catalyst causes a reduction of the temperature prevailing at the upstream surface of the downstream part of the catalyst system.

Preferably, the temperature of the upstream surface of the downstream part of the catalyst system is at most 1150° C., more preferably at most 1100° C.

It has been found that the temperature of the upstream surface of the downstream part of the catalyst system can be further reduced if the (partly converted) feed mixture that contacts the upstream surface of the downstream part has a component of its flow direction that is parallel to the upstream surface of the downstream part of the catalyst system, such as described in International Patent Application WO 01/46068 herein incorporated by reference. This is for example the case when the feed mixture is approaching the downstream part of the catalyst in a swirling movement.

It has been found that, in the process according to the invention, the temperature at the upstream surface of the downstream part of the catalyst system is in general lower than the temperature at the upstream surface of the upstream part of the catalyst system. It will be appreciated that it will inter alia depend on the relative volumes and amounts of catalytic active material of the upstream and downstream catalyst parts and of the exact configuration of those parts, if and to what extent the temperature at the upstream surface of the downstream part is lower. The temperature of the upstream surface of the downstream part of the catalyst system is preferably at least 50° C. lower than the temperature of the upstream part of the catalyst system.

In order to achieve a high yield in the process according to the invention, it is important that the degree of feedstock conversion and the selectivity towards carbon monoxide and hydrogen of the downstream part of the catalyst system are high. This can be achieved by using a downstream part in the form of a porous catalyst bed, since a porous catalyst has a relatively high specific surface area. Suitable porous catalyst beds comprise a porous, fixed arrangement of catalyst carrier provided with a catalytically active material. Suitable porous, fixed arrangements of catalyst carrier are known in the art. Examples are a packed bed of catalyst carrier particles, a ceramic or metal monolithic structure such as a foam or a honeycomb, an arrangement of metal gauzes or wires or combinations thereof.

Since only part of the feedstock needs to be converted at the upstream part of the catalyst system, only part of the feedstock needs to be contacted with the upstream part of the catalyst system. By arranging the upstream part of the catalyst system in the reactor in such way that it only partly fills the cross-sectional area of the fluid flow path, part of the feedstock will by-pass the upstream part of the catalyst, thereby minimising the pressure drop over the upstream part of the catalyst system.

Another consequence of the fact that only part of the feedstock needs to be converted at the upstream part of the catalyst system is that the upstream part does not need to have a relatively high specific surface. Therefore, the upstream part of the catalyst may be in the form of a non-porous fixed arrangement. Suitably, the upstream part of the catalyst system is in the form of a porous or non-porous fixed arrangement of catalyst carrier provided with catalytically active material.

Since the upstream part of a catalyst is the part that will be most subjected to thermal shocks, the catalyst carrier of the upstream part of the catalyst is preferably made of metal.

Preferably, such a metal catalyst carrier is in the form of a non-porous metal structure, for example a metal foil or plate. Typically such metal foils or plates will have a thickness in the range of from 0.1 to 2 mm. A non-porous metal structure can be made of more robust material, i.e. more resistant to high temperatures and high thermal shocks, than porous metal arrangements such as foams or arrangements of metal wires. Thus, by using a non-porous metal structure as the catalyst carrier of the upstream part of the catalyst system, the catalyst system is most robust at the point where the conditions, especially temperature and thermal shocks, are most severe.

Reference herein to conversion is to the percentage of the hydrocarbonaceous feedstock that is converted into lower hydrocarbonaceous compounds and/or carbon oxides. Reference herein to selectivity is to the sum of moles carbon monoxide and hydrogen produced divided by the theoretical maximum sum of moles carbon monoxide and hydrogen that can be produced. Reference herein to a porous catalyst is to a catalyst having pores, i.e. spaces or interstices between adjacent portions of the catalyst, having an average diameter in the order of magnitude of 0.05 to about 3 mm. These pores are to be contrasted with pores which may be present in the catalyst material itself, typically having an average diameter in the order of magnitude of tenths to a few micrometers. Examples of porous structures are foams, honeycombs, wire arrangements and packed beds of particles.

Suitable catalyst carrier materials, both for the upstream and the downstream part of the catalyst system, are well known in the art and include refractory oxides, such as silica, alumina, titania, zirconia and mixtures thereof, and metals. Preferred refractory oxides are zirconia-based, more preferably comprising at least 70% by weight zirconia, for example selected from known forms of (partially) stabilised zirconia or substantially pure zirconia. Most preferred zirconia-based materials comprise zirconia stabilised or partially-stabilised by one or more oxides of Mg, Ca, Al, Y, La or Ce. Preferred metals are alloys, more preferably alloys containing iron, chromium and aluminium, such as fecralloy-type materials.

Metal catalyst carriers are preferably coated with a stabilised or partially stabilised zirconia. The zirconia layer is coated on the catalyst carrier prior to applying the catalytically active metal(s) on it. Advantages of such a coating are that the stability and the yield of the catalyst are improved and that direct contact between the catalytically active material and the metals from the metal carrier is minimised or avoided.

The stabilised or partially stabilised zirconia may be coated on the catalyst carrier by techniques known in the art, preferably by means of washcoating techniques such as spraying, dipping or direct application of a sol or suspension of zirconia. Preferably, the carrier is dried and calcined after washcoating. The sol or suspension of zirconia may comprise small amount of other oxides or binders, for example alumina. Preferably, the amount of other oxides or binders is less than 20% by weight, based on the amount of stabilised zirconia, more preferably less than 10% by weight.

Preferably, the zirconia is stabilised with one or more oxides selected from oxides of Ca, Mg, Al, Ce, La, and Y, more preferably selected from Ca and Y. Preferably, the amount of stabiliser is in the range of from 1 to 10% by weight, based on the weight of stabilised zirconia, preferably in the range of from 3 to 7% by weight.

Both the catalyst carrier of the downstream and of the upstream part of the catalyst system is provided with a catalytically active material, preferably a catalytically active material suitable for the partial oxidation of hydrocarbonaceous feedstocks. Such catalytically active materials are known in the art. One or more metals selected from Group VIII of the Periodic Table of the Elements are very suitable as catalytically active material. Rhodium, iridium, palladium and/or platinum are preferred, especially rhodium and/or iridium. Typically, the catalyst comprises the catalytically active metal(s) in a concentration in the range of from 0.02 to 10% by weight, based on the total weight of the catalyst, preferably in the range of from 0.1 to 5% by weight. The catalyst may further comprise a performance-enhancing inorganic metal cation selected from Al, Mg, Zr, Ti, La, Hf, Si, Ba, and Ce which is present in intimate association supported on or with the catalytically active metal, preferably a zirconium cation.

The catalyst carrier is provided with the catalytically active material by means known in the art, e.g. by impregnation or (co)precipitation.

The process according to the present invention is particularly advantageous if the catalyst bed of the downstream part of the catalyst system comprises a fixed arrangement of a metal catalyst carrier. Porous metal arrangements of such as metal foams, honeycombs or arrangements of metal gauze, wire or foil, are very suitable catalyst carriers for catalytic partial oxidation processes, because they are very resistant to thermal shocks. A disadvantage of metal arrangements, especially if they contain thin metal wires, however, is that the metal can melt if it is exposed at high temperatures. It will be appreciated that the melting temperature depends inter alia of the metal composition, the form of the metal arrangement and the duration of the exposure to that temperature. In the process according to the present invention, very high temperatures at the upstream surface of the downstream part of the catalyst system are avoided such that wire arrangements of metals can be used under severe process conditions as catalyst carrier for the downstream part.

An advantage of a metal catalyst carrier in the upstream part of the catalyst system is that it may be provided with means for electrically heating it, in order to facilitate catalytic ignition of the upstream part of the catalyst during start-up of the catalyst system. The metal catalyst carrier of the upstream part may for example be provided with an electrical igniter. Alternatively, the metal upstream part may be in the form of an igniter. This may for example be realised by using a narrow strip of metal as the catalyst carrier of the upstream part of the catalyst system, over which a potential difference can be applied.

In the catalyst system of the process of the present invention, the catalytic composition of the upstream part and of the downstream part can be optimised independently from each other. The composition of the upstream part will be optimised towards resistance to high temperatures and thermal shock, whereas the composition of the downstream part will be optimised towards maximum degree of conversion and selectivity.

Preferably, the distance between the upstream part and the downstream part of the catalyst system is small, such that heat losses are minimised, i.e. that a maximum of the heat contained in the effluent from the upstream part of the catalyst system is maintained in the reaction zone. A greater distance between the upstream and the downstream parts of the catalyst system requires a better insulation of the reactor against radiative heat losses. The upstream part of the catalyst system may be arranged on part of the upstream surface of the downstream part of the catalyst system, provided that the feed mixture and the feedstock converted at the upstream part can pass the structure in order to contact the downstream part.

The upstream part of the catalyst system may be provided with means for determining its temperature, e.g. a resistive temperature sensor in the form of a Pt wire. There is a direct dependency of the temperature of the upstream part of the catalyst and the carbon/oxygen ratio in the feed mixture of catalytic partial oxidation reactions. Thus, such an upstream catalyst with temperature sensor can be advantageously used to control the carbon/oxygen ratio in the feed mixture.

Suitable hydrocarbonaceous feedstocks for the process according to the invention comprise hydrocarbons, oxygenates or mixtures thereof. Oxygenates are defined as molecules containing apart from carbon and hydrogen atoms at least 1 oxygen atom which is linked to either one or two carbon atoms or to a carbon atom and a hydrogen atom. Examples of suitable oxygenates are methanol, ethanol, dimethyl ether and the like. The hydrocarbonaceous feedstock is gaseous when contacting the catalyst, but may be liquid under standard temperature and pressure (STP) conditions, i.e. at 0° C. and 1 atmosphere. Preferred hydrocarbonaceous feedstocks are hydrocarbons. The process according to the present invention is especially advantageous if the feedstock is a hydrocarbon stream having an average carbon number of at least 2. Preferably, the feedstock is a hydrocarbon stream having an average carbon number of at least 6.

The oxygen-containing gas may be oxygen, air, or oxygen-enriched air, preferably air.

The hydrocarbonaceous feedstock and the oxygen-containing gas are preferably present in the feed mixture in such amounts as to give an oxygen-to-carbon ratio in the range of from 0.3 to 0.8, more preferably in the range of from 0.35 to 0.65, even more preferably in the range of from 0.40 to 0.60. References herein to the oxygen-to-carbon ratio refer to the ratio of oxygen in the form of molecules ($O_2$) to carbon atoms present in the hydrocarbonaceous feedstock. If oxygenate feedstocks are used, e.g. ethanol, oxygen-to-carbon ratios below 0.3 can suitably be used.

Preferably, the feed mixture additionally comprises steam. If steam is present, the steam-to-carbon ratio is preferably in the range of from above 0.0 to 3.0, more preferably of from above 0.0 to 1.5, even more preferably of from above 0.0 to 1.0.

The feed mixture may be contacted with the catalyst at any suitable gas hourly space velocity (GHSV). In the process according to the invention, the GHSV will be typically in the range of from 20,000 to 10,000,000 Nl/l/h (normal litres of gaseous feed mixture per litre of catalyst per hour), preferably in the range of from 100,000 to 2,000,000 Nl/l/h, more preferably in the range of from 200,000 to 1,000,000 Nl/l/h. Reference herein to normal liters is to liters at STP (0° C. and 1 atm.).

The feed mixture may be contacted with the catalyst system at a pressure up to 100 bar (absolute), preferably in the range of from 1 to 50 bar (absolute), more preferably of from 1 to 10 bar (absolute).

The process of this invention could very suitably be used to provide the hydrogen feed for a fuel cell. The conversion of fuel into hydrogen that is suitable for use in a fuel cell is generally carried out is a so-called fuel processor, comprising a first reaction zone for partially oxidising and/or reforming a fuel and a second reaction zone for the water-gas shift conversion of the effluent of the first reaction zone, optionally followed by a reaction zone for the removal of carbon monoxide from the effluent of the second reaction zone.

Accordingly, the present invention further relates to a reactor comprising the catalyst system as hereinbefore defined, the reactor further comprising a catalytic reaction zone for the water-gas shift conversion of the effluent of the downstream part of the catalyst system.

The reactor according to the invention may optionally comprise a reaction zone for the removal of the remaining carbon monoxide from the effluent of the catalytic reaction zone for the water-gas shift conversion, preferably a catalytic reaction zone for the selective oxidation of carbon monoxide.

According to a further aspect, the present invention relates to a fuel cell system comprising the reactor as hereinbefore defined and a fuel cell. The fuel call may for example be a PEM fuel cell or a solid oxide fuel cell. Such a fuel cell system can for example be applied in domestic system for generating heat and power and in fuel-cell-powered vehicles. In fuel-cell-powered vehicles, frequent start-ups may occur resulting in exposure of the partial oxidation catalyst to thermal shocks. Since the process and reactor according to the invention is particularly suitably under thermal shock conditions, the fuel cell system according to the invention can advantageously be applied in fuel-cell-powered vehicles.

Accordingly, the invention further relates to a vehicle provided with a fuel cell system as hereinbefore defined.

The invention will now be illustrated by means of schematic FIGS. 1 to 3.

The catalyst system 1 shown in FIG. 1 comprises a hollow cylindrical downstream part 2 and an upstream part 3. The downstream part 2 is in the form of a porous arrangement of catalyst carrier in the form of metal fibres (fecralloy-type fibres) knitted and pressed in the shape of a hollow cylinder and provided with Rh and Ir as catalytically active metals and Zr as modifying cation. The upstream part 3 comprises a resilient fecralloy-type metal foil as catalyst carrier that is provided with Rh and Ir as catalytically active metals and Zr as modifying cation. The upstream part 3 is bend in the form of a ring that is arranged on part of the upstream surface 4 of the downstream part 3.

In FIG. 2 is shown part of a reactor containing the catalyst system of FIG. 1, i.e. the downstream part 2 and the upstream part 3 arranged on part of its upstream surface 4. The upstream part 3 is contained in the upstream part 5 of the reactor and the downstream part 2 is contained in the downstream part 6 of the reactor. The reactor further comprises a first reactant supply conduit 7 for supply of hydrocarbonaceous feedstock and a second reactant supply conduit 8 for supply of molecular-oxygen containing gas and, optionally, steam. During normal operation of the reactor, the reactants supplied via conduits 7 and 8 are mixed in a mixing zone 9, wherein a swirling movement is imposed on the thus-formed feed mixture. The swirling flow 10 of feed mixture is contacted with the catalyst system 2, 3. Part of the feed mixture is converted at the upstream part 3 of the catalyst system and part will be converted at the downstream part 2. Effluent is discharged via effluent discharge chamber 11 and discharge conduit 12. The overall direction of the fluid flow in the upstream part 5 of the reactor is in dictated with arrow 13. In the downstream part 6 of the reactor, the overall direction of the fluid flow is indicated with arrow 14.

In FIG. 3 is shown part of a reactor tube 15 having an upstream part 5 and a downstream part 6. The reactor contains a catalyst system having an upstream part 2 in the form of a round, metal catalyst carrier plate provided with Rh and Ir as catalytically active metals and Zr as modifying cation, and a downstream part 3 in the form of metal fibres (fecralloy-type fibres) knitted and pressed in the shape of a cylinder and provided with Rh and Ir as catalytically active metals and Zr as modifying cation.

During normal operation of the reactor, a flow of feed mixture 18 is first contacted with the metal plate 3 and then with the downstream part 2 of the catalyst system. Effluent is discharged in the direction indicated by arrow 19.

The diameter of the metal plate 3 is smaller than the inner diameter of the reactor tube 15 such it only partly fills the cross-sectional area of the fluid flow path and (partly converted) feed mixture can pass the pre-conversion structure in order to be able to contact the upstream surface 4 of the downstream part 2 of the catalyst system.

The process according to the invention will be further illustrated by means of the following examples. The examples should not be construed to limit the scope of the invention.

EXAMPLES

Example 1 (According to the Invention)

Catalyst System

Downstream Part

A catalyst carrier in the form of a knitted arrangement of commercially available fecralloy wire (wire diameter 0.2 mm; ex. Resistalloy, UK; wire composition: 72.6% wt Fe, 22% wt Cr, 5.3% wt Al, and 0.1% wt Y), pressed in the shape of a hollow cylinder (outer diameter: 63 mm; inner diameter: 20 mm; height: 32 mm) was calcined at a temperature of 1050° C. during 48 hours. The calcined wire arrangement was once dipcoated in a commercially available partially-stabilised zirconia (zirconium oxide, type ZO, ex. ZYP Coatings Inc., Oak Ridge, USA). The zirconia is partially stabilised with 4% wt CaO. After dipcoating, the arrangement was calcined for 2 hours at 700° C.

The coated arrangement was further provided with 0.7% wt Rh, 0.7% wt Ir, and 2.0% wt Zr, based on the total weight of the downstream part, by immersing it three times in an aqueous solution comprising rhodium trichloride, iridium tetra chloride and zirconyl nitrate. After each immersion, the arrangement was dried at 140° C. and calcined for 2 hours at 700° C.

Upstream Part

A commercially available resilient foil of PM 2000 (ex. PLANSEE, Austria; foil composition: 23.5% wt Fe, 20% wt Cr, 5.5% wt Al, 0.5% wt Ti, and 0.5% wt Y) having a length of 60 mm, a height of 15 mm, and a thickness of 0.125 mm was calcined at a temperature of 1050° C. during 48 hours. The calcined foil was once dipcoated in the same partially-stabilised zirconia as applied for the downstream part (see above). After dipcoating, the foil was calcined for 2 hours at 700° C. The coated foil was further provided with 1.0% wt Rh, 1.0% wt Ir, and 2.8% wt Zr, based on the total weight of the coated foil, by immersing it twice in an aqueous solution comprising rhodium trichloride, iridium tetra chloride and zirconyl nitrate. After each immersion, the foil was dried at 140° C. and calcined for 2 hours at 700° C.

Catalyst System

The resilient foil 3 is inserted at the inside of the cylindrical downstream part 2 to form a ring, as shown in FIG. 1, such that part of the formed ring covers part of the upstream surface 4, i.e. the surface 4 at the inside of the cylinder forming the downstream part 2. The ring is arranged against the upstream surface 4 over a height of 5 mm.

Catalytic Partial Oxidation

The catalyst system as described above is placed in a reactor as shown in FIG. 2. Naphtha (0.74 g/s), air (3.45 g/s), and steam (0.85 g/s) were mixed, pre-heated to a temperature of 190° C. and brought into a swirl movement. The swirling, pre-heated feed mixture was contacted with the catalyst system as shown in FIG. 2. The temperature of the upstream surface of the cylinder and the temperature of the ring were measured by means of an optical pyrometer.

Temperature of the upstream surface of the cylinder (downstream part of the catalyst system): 1060° C. Temperature of the ring (upstream part of the catalyst system): 1180° C.

Example 2 (Not According to the Invention)

A catalyst system in the form of a hollow cylinder was prepared in the same way as the downstream part of the catalyst system described in Example 1. The thus-prepared catalyst comprised 0.7% wt Rh, 0.7% wt Ir, and 1.9% wt Zr, based on the total weight of the catalyst. The catalyst was placed in a reactor similar to that shown in FIG. 2, but without an upstream part 3. A catalytic partial oxidation process was performed under the same conditions as described in Example 1.

Temperature of the upstream surface of the catalyst: 1175° C.

We claim:

1. A process for the catalytic partial oxidation of a hydrocarbonaceous feedstock, wherein a feed mixture comprising the hydrocarbonaceous feedstock and a molecular-oxygen containing gas in such amounts as to give an oxygen-to-carbon ratio in the range of from 0.3 to 0.8 is contacted with a catalyst system having an upstream part and a downstream part, the downstream part being in the form of a porous catalyst bed, wherein the catalyst system is retained in a reactor, the reactor comprising an upstream part that contains the upstream part of the catalyst system and a downstream part that contains the downstream part of the catalyst system, wherein the upstream part of the catalyst system only partly fills the cross-sectional area of the fluid flow path of the upstream part of the reactor and the downstream part of the catalyst system completely fills the cross-sectional area of the fluid flow path of the downstream part of the reactor.

2. The process of claim 1, wherein 5% to 75% (v/v) of the feedstock is converted at the upstream part of the catalyst system.

3. The process of claim 1, wherein the temperature of the upstream surface of the downstream part of the catalyst system is at most 1150° C.

4. The process of claim 1, wherein the feed mixture has a swirling movement when contacting the downstream part of catalyst system.

5. The process of claim 1, wherein the upstream part of the catalyst system is in the form of a metal catalyst carrier provided with a catalytically active material.

6. The process of claim 5, wherein the metal is a high-temperature resistant metal.

7. The process of claim 5, wherein the metal catalyst carrier of the upstream part of the catalyst system is in the form of a non-porous metal structure.

8. The process of claim 5, wherein the upstream part of the catalyst system is provided with means for electrically heating it.

9. The process of claim 1, wherein the catalyst bed of the downstream part of the catalyst system comprises a metal catalyst carrier provided with a catalytically active material.

10. The process of claim 9, wherein the metal catalyst carrier of the catalyst bed of the downstream part of the catalyst system is an arrangement of metal wire.

11. The process of claim 1, wherein the upstream part of the catalyst system is arranged on part of the upstream surface of the downstream part of the catalyst system.

12. The process of claim 1, wherein the upstream part of the catalyst system is provided with means for determining its temperature.

13. A process for the catalytic partial oxidation of a hydrocarbonaceous feedstock, wherein a feed mixture comprising the hydrocarbonaceous feedstock and a molecular-oxygen containing gas in such amounts as to give an oxygen-to-carbon ratio in the range of from 0.3 to 0.8 is contacted with a catalyst system having an upstream part and a downstream part, the downstream part being in the form of a porous catalyst bed, wherein the catalyst system is retained in a reactor, the reactor comprising an upstream part that contains the upstream part of the catalyst system and a downstream part that contains the downstream part of the catalyst system, wherein the upstream part of the catalyst system is in the form of a metal catalyst carrier provided with a catalytically active material and only partly fills the cross-sectional area of the fluid flow path of the upstream part of the reactor and the downstream part of the catalyst system completely fills the cross-sectional area of the fluid flow path of the downstream part of the reactor.

14. The process of claim 13, wherein the metal catalyst carrier of the upstream part of the catalyst system is in the form of a non-porous metal structure.

15. The process of claim 13, wherein the upstream part of the catalyst system is provided with means for electrically heating it.

16. The process of claim 13, wherein the catalyst bed of the downstream part of the catalyst system comprises a metal catalyst carrier provided with a catalytically active material.

17. The process of claim 16, wherein the metal catalyst carrier of the catalyst bed of the downstream part of the catalyst system is an arrangement of metal wire.

18. A process for the catalytic partial oxidation of a hydrocarbonaceous feedstock, wherein a feed mixture comprising the hydrocarbonaceous feedstock and a molecular-oxygen containing gas in such amounts as to give an oxygen-to-carbon ratio in the range of from 0.3 to 0.8 is contacted with a catalyst system having an upstream part and a downstream part, the downstream part being in the form of a porous catalyst bed, wherein the catalyst system is retained in a reactor, the reactor comprising an upstream part that contains the upstream part of the catalyst system and a downstream part that contains the downstream part of the catalyst system, wherein the upstream part of the catalyst system is in the form of a metal catalyst carrier provided with a catalytically active material and only partly fills the cross-sectional area of the fluid flow path of the upstream part of the reactor and the downstream part of the catalyst system comprises a metal catalyst carrier provided with a catalytically active material and completely fills the cross-sectional area of the fluid flow path of the downstream part of the reactor.

* * * * *